(12) United States Patent
Maringer et al.

(10) Patent No.: US 12,173,762 B2
(45) Date of Patent: Dec. 24, 2024

(54) POWERTRAIN METHOD AND APPARATUS

(71) Applicant: GKN Automotive Ltd., Birmingham (GB)

(72) Inventors: Thorsten Paul Maringer, Bergisch Gladbach (DE); Lutz Momsen, Cologne (DE); Zichao Zhou, Troisdorf (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/562,966

(22) PCT Filed: May 31, 2021

(86) PCT No.: PCT/EP2021/064538
§ 371 (c)(1),
(2) Date: Nov. 21, 2023

(87) PCT Pub. No.: WO2022/253402
PCT Pub. Date: Dec. 8, 2022

(65) Prior Publication Data
US 2024/0271669 A1 Aug. 15, 2024

(51) Int. Cl.
*F16D 48/06* (2006.01)
*F16D 27/118* (2006.01)
*F16D 127/02* (2012.01)

(52) U.S. Cl.
CPC .......... *F16D 48/064* (2013.01); *F16D 27/118* (2013.01); *F16D 2127/02* (2013.01);
(Continued)

(58) Field of Classification Search
CPC .. F16D 48/064; F16D 27/118; F16D 2127/02; F16D 2500/1022;
(Continued)

(56) References Cited

U.S. PATENT DOCUMENTS

| | | | | |
|---|---|---|---|---|
| 4,620,261 A | * | 10/1986 | Thornton | F16D 48/064 192/84.1 |
| 5,179,496 A | * | 1/1993 | Mimura | H02M 3/157 192/84.92 |

(Continued)

FOREIGN PATENT DOCUMENTS

| | | |
|---|---|---|
| DE | 102015113083 A1 | 2/2017 |
| WO | 2009001191 A2 | 12/2008 |
| WO | 2018157950 A1 | 9/2018 |

OTHER PUBLICATIONS

International Search Report and Written Opinion for PCT/EP2021/064538 mailed Mar. 1, 2022 (11 pages; with English translation).

*Primary Examiner* — Jacob S. Scott
*Assistant Examiner* — Farhana Pervin
(74) *Attorney, Agent, or Firm* — Reising Ethington P.C.

(57) ABSTRACT

A powertrain of a vehicle can be operated. The powertrain can have at least one transmission housing, a clutch assembly which is arranged therein and which comprises a clutch that operates in a positively locking manner, and an actuation unit for actuating the clutch. The clutch comprises at least one first clutch component, which can be moved along an axial direction, and a second clutch component, said clutch components being connected together in a form-fitting manner upon actuating the clutch; wherein the actuation unit comprises an electromagnetic actuator with a piston, and the piston is moved from a starting position into an end position along the axial direction upon actuating the clutch, thereby moving the first clutch component.

14 Claims, 2 Drawing Sheets

(52) U.S. Cl.
CPC ............... *F16D 2500/1022* (2013.01); *F16D 2500/10412* (2013.01); *F16D 2500/10462* (2013.01); *F16D 2500/1107* (2013.01); *F16D 2500/3022* (2013.01); *F16D 2500/3026* (2013.01); *F16D 2500/50607* (2013.01); *F16D 2500/7041* (2013.01)

(58) Field of Classification Search
CPC . F16D 2500/10412; F16D 2500/10462; F16D 2500/1107; F16D 2500/3022; F16D 2500/3026; F16D 2500/50607; F16D 2500/7041
See application file for complete search history.

(56) References Cited

U.S. PATENT DOCUMENTS

| | | | |
|---|---|---|---|
| 2005/0148429 A1* | 7/2005 | Imai | F16H 61/0251 477/175 |
| 2005/0277510 A1* | 12/2005 | Fusegi | F16H 48/34 475/231 |
| 2005/0279607 A1* | 12/2005 | Fusegi | F16H 48/24 192/84.96 |
| 2010/0005768 A1* | 1/2010 | Silbernagel | A01D 69/08 56/10.2 R |
| 2010/0033890 A1* | 2/2010 | Harnett | F16D 48/064 361/160 |
| 2015/0354643 A1* | 12/2015 | Ebuchi | F16D 48/064 192/69 |
| 2017/0198766 A1* | 7/2017 | Onitake | F16D 48/064 |
| 2018/0038422 A1* | 2/2018 | Yoshisaka | F16D 11/14 |
| 2018/0340606 A1* | 11/2018 | Deitmers | F16C 25/02 |
| 2020/0003265 A1* | 1/2020 | Seidl | F16D 48/06 |
| 2020/0132180 A1* | 4/2020 | Tsuzuki | B60K 1/00 |

* cited by examiner

POWERTRAIN METHOD AND APPARATUS

CROSS-REFERENCE TO RELATED APPLICATIONS

This application is a national stage of, and claims priority to, Patent Cooperation Treaty Application No. PCT/EP2021/064538, filed on May 31, 2021, which application is hereby incorporated herein by reference in its entirety.

BACKGROUND

A powertrain in a vehicle can comprise at least one transmission housing and a clutch assembly arranged therein with a clutch that operates interlockingly and an actuation unit for actuating the clutch. The clutch can comprise at least a first clutch component and a second clutch component, which are interlockingly connected to one another when the clutch is actuated.

Such a powertrain can be provided for connecting an electric machine to a drive shaft or to a differential of a drive axle of the vehicle. A drive power of the electric machine can be transmitted here via the drive shaft or the differential, for example to wheels of the vehicle to drive the vehicle. The clutch can be actuated on request, for example by detecting a corresponding request from a higher-level control system or a user of the vehicle.

The actuation unit can comprise an electromagnetic actuator with a piston, wherein the piston is displaced from a starting position into an end position to actuate the clutch. At least the piston and the clutch can be at least partially acted upon by a transmission fluid. Typically, torque should only be transmitted via the clutch components once a fully engaged state of the clutch components has been established, in which they form a secured interlocking connection with one another. In this fully engaged state, the piston is arranged in the end position.

In powertrains of this design, at least the piston and the clutch can be at least partially (or completely) in a transmission fluid, typically an oil.

It is typically desirable that, starting from a starting position, the end position of the piston is reached as quickly as possible after the request to actuate the clutch is detected. Due to the inductivity of an electromagnetic or solenoid actuator and the associated resistance, the current build-up for generating the actuator actuating force is significantly predetermined temporally. A maximum control current, makes improvement of the current build-up difficult in terms of control technology.

Further, the closing switching time of the clutch assembly, i.e., the time in which the piston reaches the end position from the starting position, cannot be improved with the solenoid actuator without increasing the maximum control current. However, an increase in the maximum control current could require a design of current-carrying components, such as the power electronics, that corresponds to the higher maximum current load. This entails higher component costs.

WO 2018/157950 A1 discloses a powertrain with a clutch assembly arranged in a transmission housing.

SUMMARY

The present disclosure relates to a method for operating a powertrain and to a powertrain of a vehicle. Described herein is a method with which a clutch can be actuated more quickly. A powertrain can be provided in which torque can be transmitted more quickly via the clutch and made available to the wheels.

A method for operating a powertrain of a vehicle is disclosed, wherein the powertrain has at least one transmission housing and a clutch assembly arranged therein with a clutch that operates interlockingly (form-fit-connected/positively connected) and an actuation unit for actuating the clutch. The clutch (for example a dog clutch) comprises at least a first clutch component displaceable in an axial direction and a second clutch component. The first and second clutch components are interlockingly connected to one another when the clutch is actuated. The actuation unit comprises an electromagnetic actuator with a piston. To actuate the clutch, the piston is displaced in the axial direction from a starting position to an end position. The first clutch component is actuated by the piston and displaced in the axial direction with the piston. The clutch components are not interlockingly connected to one another until a synchronization state has been reached, i.e., when the speeds of the clutch components to be coupled differ only minimally, for example.

Typically, torque is only transmitted via the clutch components once a fully engaged state of the clutch components has been established, wherein the piston is arranged in the end position in this first state.

The disclosed method comprises at least the following steps:
a) determining a request to actuate the clutch and to establish the interlocking connection between the clutch components, typically at a first point in time;
b) energizing the actuator with a bias current, wherein the piston remains in the starting position, typically at the first point in time;
c) initiating synchronization of the speeds of the clutch components, typically at the first point in time;
d) determining that the synchronization state has been reached by the clutch components, typically at a second point in time;
e) energizing the actuator with an actuating current, wherein the piston is displaced from the starting position to the end position, typically at the second point in time.

Method steps a) to e) can be carried out in the disclosed order. It is possible for the method steps to be carried out partially or completely overlapping one another in time. Typically, steps b) to e) are initiated after step a). It is possible that all further steps b) to e) are carried out after step a). Typically, step b) is initiated at the same time as step c) and is carried out at least temporarily in parallel with one another. Typically, step b) is carried out until step e) is initiated. Typically, step e) is only carried out if the synchronization state is determined in accordance with step d). Typically, when step e) is initiated, step b) may not yet have been completed, for example the bias current may not yet have been increased to its intended value.

It is possible that the disclosed method is carried out for each actuation of the actuator and/or movement of the piston from the starting position triggered in the powertrain.

Typically, the powertrain or the actuation unit comprises a system for data processing, for example a control unit, which has means for carrying out the steps of the method or which is suitably equipped, configured or programmed for carrying out the steps of the method.

Typically, the electromagnetic actuator comprises a coil to which an electric current is applied to displace the piston.

According to step a), a request to actuate the clutch is detected, for example by the system, typically at a first point in time. The request is made typically by a higher-level control unit or system or by a user of the vehicle. The system of the powertrain or the actuation unit then initiates the further steps of the method, typically steps b) and c), possibly parallel to one another and/or simultaneously, typically at the first point in time or immediately thereafter. The request to actuate the clutch is directed to establishing the interlocking connection of the clutch components with one another.

According to step b), the actuator is energized with a bias current, wherein the piston remains in the starting position. Typically, therefore, an electrical current required to move the piston is not established. Possibly, however, the bias current is as high as possible, wherein the piston should not move, however. Typically, the piston is not deliberately held back, but the resistances present in the clutch assembly or in the actuation unit are not overcome by the bias current.

The value of the bias current can be determined in preliminary tests on prototypes (and not on the actual clutch assembly). Alternatively or additionally, the value of the bias current can be determined on the actual clutch assembly, for example as part of a test of the clutch assembly, the powertrain or a fully assembled vehicle or even during operation of a vehicle. The value of the bias current can be ascertained and determined repeatedly, for example depending on ambient conditions such as temperature or the condition or type of transmission fluid. This allows the largest possible bias current to be set for certain operating points.

For example, the value of a bias current can be continuously increased until a movement of the piston is detected. The value of the current applied to the actuator can then be multiplied by a safety factor (e.g., less than "1") so that a value for the bias current is determined at which a displacement of the piston can be ruled out with sufficient certainty. The bias current value determined in this way can, for example, be stored in the system and called up later during operation of the vehicle.

Typically, at least the piston and the clutch are at least partially acted upon by a transmission fluid. The movement of the piston can be inhibited to a greater extent if a transmission fluid is present or the components are arranged in the transmission fluid. Typically, the bias current can be increased to a higher value.

According to step c), synchronization of the speeds of the clutch components is initiated, typically at the first point in time or immediately thereafter. Step c) takes place following the detection of a request to actuate the clutch in accordance with step a). In step c), the speeds of the clutch components are synchronized with one another as quickly as possible.

According to step d), the clutch components, in particular the system, determine whether the synchronization state has been reached, typically at a second point in time. The speeds of the clutch components must be similar here to the extent that coupling of the clutch components is possible. The boundary conditions for the coupling, for example the size of a maximum differential speed, can be stored in the system and checked in accordance with step d). The presence of a (minimum) speed difference is provided here so that coupling of the clutch components is possible.

If a synchronization state is reached, an actuating current is applied to the actuator in step e), wherein the piston is moved from the starting position to the end position. Typically, the actuating current is significantly greater than the previously applied bias current. The actuating current is used to overcome the resistances in the clutch assembly, such as those present in step b), and the piston is displaced in the axial direction to actuate the clutch. Step e) takes place typically at the second point in time or immediately thereafter.

Typically, if, for example, the synchronization state is reached quickly, for example after a motor vehicle has come to a standstill, step b) may not yet have been completed at the time step e) is initiated. For example, the actual current may not yet have reached the value to be achieved for the setpoint bias current, so that the actual current is directly increased further to the value of the actuating current.

By energizing the actuator with the bias current, the switching time for closing the clutch can be improved without having to increase the maximum control current. In order to be able to close the clutch, the speeds of both sides of the interlocking clutch, i.e., the first clutch component and the second clutch component, must be synchronized before the actuator is actuated or before the piston is displaced. During this synchronization phase according to step c), the electromagnetic actuator can be pre-powered with a defined (bias) current that corresponds to an actuation force that is still below the static friction limit of the actuation unit and therefore cannot lead to premature and unintentional closing of the clutch.

After the synchronization phase, the actuator is then controlled to the maximum control current—the actuating current—to close the clutch. As the maximum control current, i.e., the actuating current, no longer builds up from zero amps, but from the value of the bias current, which is greater than zero amps, the time for the current build-up is shortened, resulting in a shorter switching time when the clutch is closed.

In conventional clutch assemblies, the time between the initiation of the actuating current (at a second point in time) and reaching the end position of the piston or of the first clutch component (at a third point in time) is between 85 and 115 milliseconds (i.e., the time span between the second point in time and the fourth point in time); this time until the end position is reached (when bias current is applied: i.e., the time span between the second point in time and a fourth point in time) can be shortened to approximately 65 to 80 milliseconds, i.e., by approximately 20 milliseconds, by energizing the actuator with the bias current.

Typically, the bias current is at least 20% of the actuating current, especially at least 25% of the actuating current. Typically, the bias current is at most 50% of the actuating current, possibly at most 35% of the actuating current.

Typically, a value of the bias current is kept constant until step e) is initiated. The term "constant" means in the present context that the value of the bias current varies during this time, after initiation of step b) and/or after reaching the predetermined value of the bias current and until initiation of step e), by at most 10%, possibly by at most 5%.

Typically, the actuating current is at most 6 amperes, in particular at most 4 amperes, possibly at most 3.5 amperes.

Typically, static friction of the components of the clutch assembly displaced during actuation of the actuation unit is only overcome by the actuator when the bias current is exceeded. Typically, the bias current is set so that a current at which the piston has moved during preliminary tests is at least 5% greater, possibly at least 10% greater, or at least 20% greater than the value of the currently set bias current or the bias current set in step b).

Typically, the components for which the static friction has to be overcome by the actuating current or does not have to be overcome by the bias current include at least the piston and at least one or all of the following components:

a sliding disk arranged between the piston and a sensor disk;

a sensor disk that interacts with a position sensor to determine the position of the piston;

a return spring which, as an energy store element, provides a force for the return movement of the piston from the end position back to the starting position;

a cam ring as the first clutch component.

The sliding disk is used for spacing components that rotate at different speeds. The sliding disk reduces friction between the components (otherwise, i.e., without the sliding disk) in contact with one another, so that relative rotation of the components can take place with as little loss as possible. Typically, the piston contacts the sensor disk and/or the first clutch component via the sliding disk.

Typically, the sensor disk interacts with a fixed-position sensor that is intended to detect the position of the piston. The sensor disk is connected to the piston, the sliding disk and/or the first clutch component so that their displacement is transmitted to the sensor disk. The displacement of the sensor disk and thus the displacement of the piston or the first clutch component can be determined via the sensor.

The return spring is used to return the piston to its starting position. Typically, the return spring works together with the sensor disk and is supported on a stationary component of the clutch assembly, for example the housing. When the piston is displaced, the return spring stores the work required for the displacement and returns it to the actuation unit after the actuator has been actuated. This allows the piston to be moved back to its starting position.

The cam ring is designed to form an interlocking connection with the second clutch component, e.g., an interlocking connection with respect to the circumferential direction.

The components mentioned, such as the sensor disk, can move within a transmission fluid, typically a liquid, or are at least acted upon by it. If a transmission fluid is present, the movement of the components mentioned is inhibited even more, so that the bias current has a higher value.

Typically, the clutch assembly has a sensor for determining the position of the piston. The sensor interacts with the sensor disk.

Typically, the system responsible for carrying out the method, for example in the vehicle, can be designed to be "self-learning." For example, the value of the bias current set according to step b) can be determined in dependence on the ambient conditions determined.

A powertrain of a vehicle is disclosed, comprising at least one transmission housing and a clutch assembly arranged therein with an interlocking clutch and an actuation unit for actuating the clutch. The clutch comprises at least a first clutch component, which can be displaced in an axial direction, and a second clutch component, which are connectable or are connected to one another interlockingly when the clutch is actuated. The actuation unit comprises an electromagnetic actuator with a piston. The piston can be displaced from a starting position to an end position to actuate the clutch and to displace the first clutch component, or is displaced when the clutch is actuated. The clutch components can only be interlockingly connected to one another once a synchronization state has been reached.

At least the piston and the clutch can be at least partially acted upon by a transmission fluid.

Typically, the powertrain or the actuation unit comprises a system for data processing, for example a control unit, which has means for carrying out the steps of the method and/or which has means suitably equipped, configured or programmed for carrying out the steps of the method.

Typically, torque is only transmitted via the clutch components once a fully engaged state of the clutch components has been determined, for which the piston is arranged in the end position. Typically, the position of the piston can be determined via a sensor.

Typically, a vehicle is disclosed that has the described powertrain and wheels that can be driven thereby.

Typically, at least one system for data processing is provided, which has means which initiate and control the method and which are equipped, configured or programmed to carry out the method.

The means include, for example, data lines or transmission devices that enable the transmission of commands, measured values, data or similar between the elements listed.

There is further disclosed a computer program comprising instructions which, when the program is executed by a computer, cause the computer to perform the described method or the steps of the described method.

There is further disclosed a computer-readable storage medium comprising instructions which, when executed by a computer, cause the computer to perform the described method or the steps of the described method.

Typically, the embodiments for the method are transferable to the powertrain, the vehicle, the data processing system and/or the computer-implemented method (i.e., the computer program and the computer-readable storage medium), and vice versa.

The use of indefinite articles ("a" and "an"), in particular in the claims and the description reproducing them, is to be understood as such and not as a number word. Accordingly, terms or components introduced in this way are to be understood as being present at least once and, in particular, may also be present more than once.

As a precaution, it should be noted that the number words used here ("first," "second," etc.) primarily serve (only) to distinguish between several similar objects, quantities or processes, i.e., in particular they do not necessarily specify any dependency and/or sequence of these objects, quantities or processes in relation to one another. If a dependency and/or sequence is required, this is explicitly stated here or is obvious to a person skilled in the art when studying the specific embodiment described. Insofar as a component may occur more than once ("at least one"), the description of one of these components may apply equally to all or some of the plurality of these components, but this is not mandatory.

BRIEF SUMMARY OF THE DRAWINGS

The disclosure explained in greater detail below with reference to the appended figures. It should be noted that the invention is not intended to be limited by the embodiments described. Typically, unless explicitly shown otherwise, it is also possible to extract partial aspects of the substantive matter explained in the figures and to combine them with other components and findings from the present description. Typically, it should be noted that the figures and especially the proportions shown are only schematic.

In the figures.

DESCRIPTION

Figure 1:
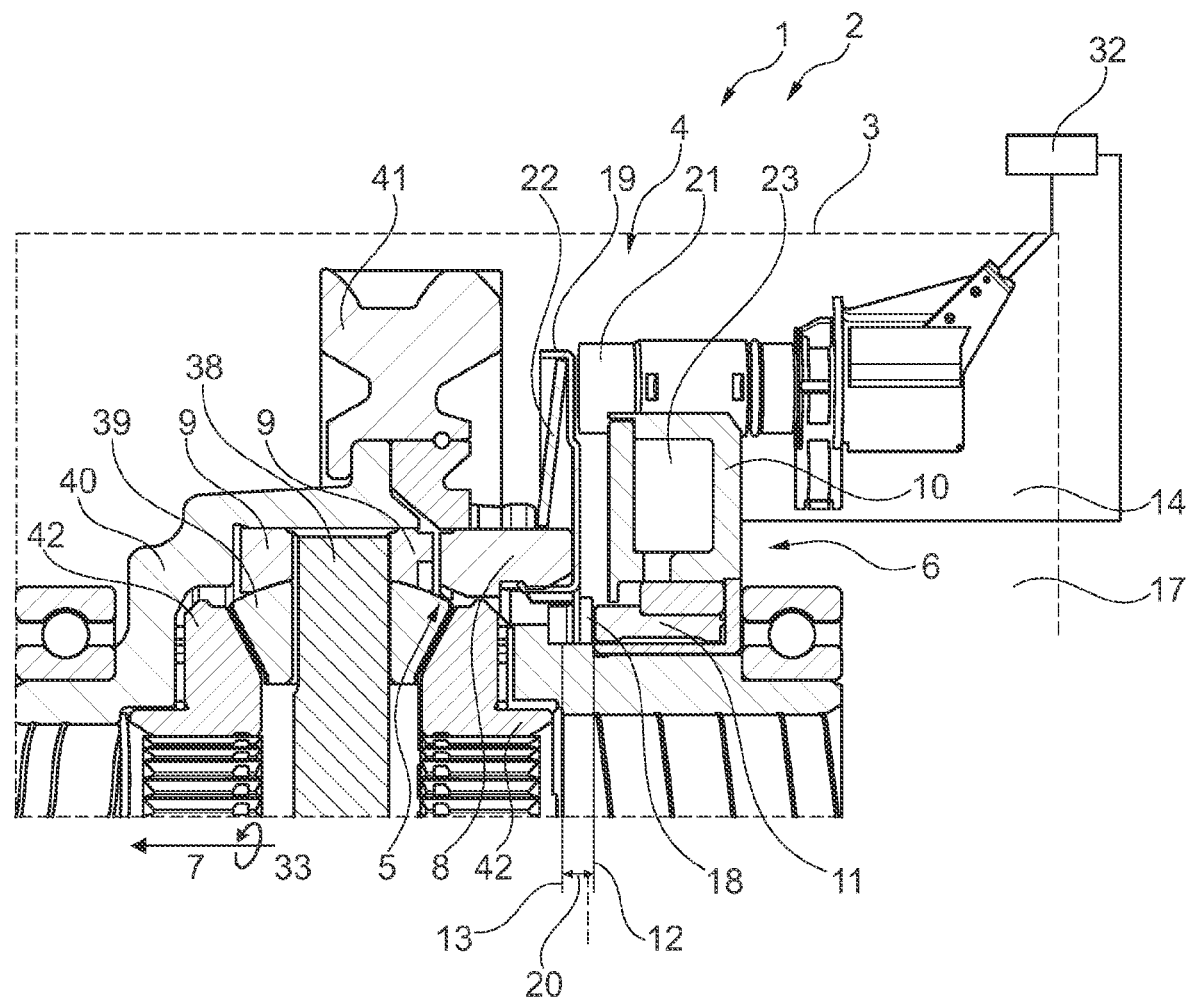
FIG. 1: shows a partial view of a powertrain in a side view in section.

FIG. 1 shows a partial view of a powertrain 1 in a side view in section. The powertrain 1 is part of a vehicle 2. The powertrain 1 comprises a transmission housing 3 and a clutch assembly 4 arranged therein with an interlocking clutch 5 and an actuation unit 6 for actuating the clutch 5. The clutch 5 comprises a first clutch component 8 displaceable in an axial direction 7 and a second clutch component 9 which are connectable or are connected to one another interlockingly when the clutch 5 is actuated. The actuation unit 6 comprises an electromagnetic actuator 10 with a piston 11. The powertrain 1 or the actuation unit 6 comprises a system 32 for data processing. The piston 11 is displaceable from a starting position 12 to an end position 13 in order to actuate the clutch 5 and in order to displace the first clutch component 8, or is displaced when the clutch 5 is actuated. The clutch components 8, 9 can only be interlockingly connected to one another once a synchronization state has been reached. At least the piston 11 and the clutch 5 are at least partially acted upon by a transmission fluid 14. The system 32 comprises means which are suitably designed and set up for carrying out the method described, or with which the method is carried out.

The actuator 10 comprises a coil 23 to which an electrical actuating current 17 is applied to displace the piston 11. The sliding disk 18 is displaced by the piston 11 and the sensor disk 19 is displaced via the sliding disk 18. The position sensor 21 detects the position 20 of the sensor disk 19 and thus of the piston 11.

The sliding disk 18 is used to space components that rotate at different speeds. Friction between the components (otherwise, i.e., without a sliding disk) contacting one another is reduced via the sliding disk 18 so that relative rotation of the components can take place with as little loss as possible. The piston 11 contacts the sensor disk 19 via the sliding disk 18.

The sensor disk 19 interacts with the stationary position sensor 21, which is provided to detect the position 20 of the piston 11. The sensor disk 19 is connected to the piston 11, the sliding disk 18 and the first clutch component 8, so that their displacement is transmitted to the sensor disk 19. The displacement of the sensor disk 19 and thus the displacement of the piston 11 or the first clutch component 8 can be determined via the position sensor 21.

The return spring 22 is used to move the piston 11 back to the starting position 12. The return spring 22 interacts with the sensor disk 19 and is supported on a stationary component of the clutch assembly 4, for example the transmission housing 3. When the piston 11 is displaced, the return spring 22 stores the work required for the displacement and returns it to the actuation unit 6 after the actuator 10 has been actuated. This allows the piston 11 to be moved back to the starting position 12.

The cam ring is designed to form an interlocking connection, such as an interlocking connection with respect to the circumferential direction 33, with the second clutch component 9. The second clutch component 9 is connected, for conjoint rotation, to the axle 38 of the pinion gears 39 of the differential. The side bevel gears 42 of the differential are connected to the wheels of the vehicle 2 for conjoint rotation. The pinion gear 39 is rotatably arranged on the axle 38 and connected to the side bevel gears 42.

The differential cover 40 and the gearwheel 41 connecting the differential to the drive unit via the transmission are connected to one another for conjoint rotation. The first clutch component 8 is connected to the differential cover 40 for conjoint rotation.

The gearwheel 41 is connected for conjoint rotation to the axle 38 via the clutch components 8, 9.

Figure 2:
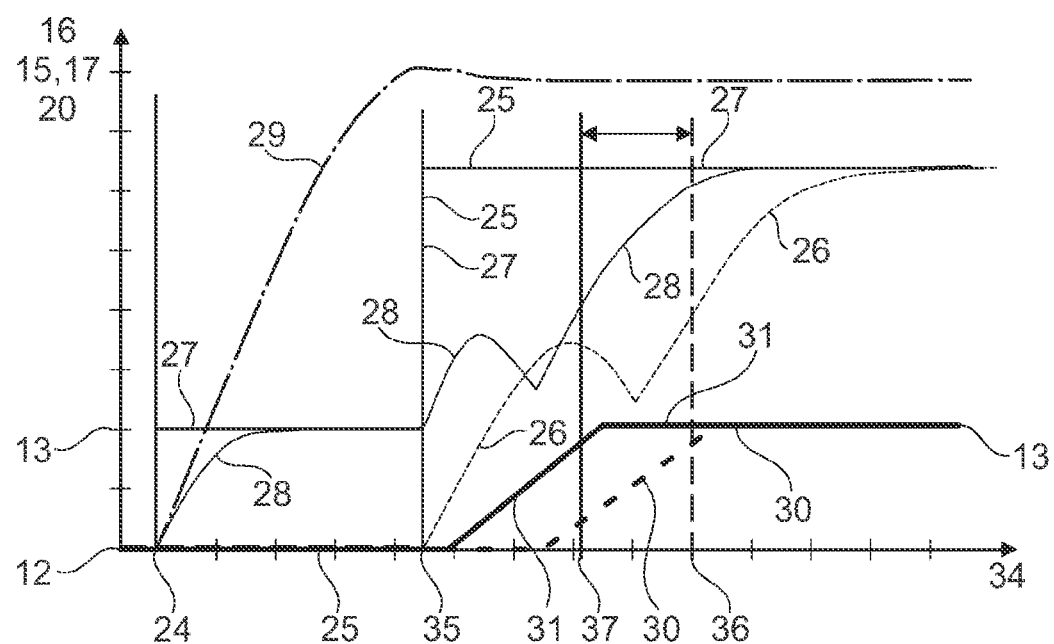
FIG. 2: shows a graph containing several curves.

FIG. 2 shows a graph containing several curves 25, 26, 27, 28, 29, 30, 31. A speed 16, a position 20, and a current 15, 17 are plotted on the vertical axis. The time 34 is plotted on the horizontal axis.

The method begins at a first point in time 24 with step a). A request to actuate the clutch 5 is determined here by the system 32. The system 32 of the actuation unit 6 then initiates the further steps of the method. The request to actuate the clutch 5 is aimed at establishing an interlocking connection of the clutch components 8, 9.

The first curve 25 shows the course of the electrical setpoint current when no bias current 15 is to be set. It can be seen here that a synchronization of the speeds 16, see fifth curve 29, is achieved before the setpoint current is increased from the value zero to the value of the actuating current 17 at the second time 35.

The second curve 26 shows the course of the actual electrical current that follows the theoretically required setpoint current in time and that is actually applied in clutch assembly 4.

The sixth curve 30 shows the course of the position 20 of the first clutch component 8 when no bias current 15 is set. The first clutch component 8 is actuated by the piston 11, which moves in the axial direction 7 between a starting position 12 and an end position 13 and transmits this movement to the first clutch component 8. At a fourth point in time 37, the first clutch component 8 or the piston 11 reaches its end position 13 in the axial direction 7.

The third curve 27 shows the curve of the electrical setpoint current when a bias current 15 is set. The fourth curve 28 shows the curve of the actual electrical current that follows the theoretically required target current according to the third curve 27 and that is actually applied in the clutch assembly 4.

It can be seen that step b) is initiated immediately after the first point in time 24. According to step b), the actuator 10 is energized with a bias current 15 by the system 32, wherein the piston 11 remains in the starting position 12. An electrical current required to move the piston 11, for example the actuating current 17, is therefore not set. However, the bias current 15 is as high as possible, wherein the piston 11 is not, however, intended to move. The piston 11 is held back here in the starting position 12 by the resistors present in the clutch assembly 4 or in the actuation unit 6.

According to step c), a synchronization of the speeds 16 of the clutch components 8, 9 is initiated; see fifth curve 29. Step c) takes place as a result of the detection of a request to actuate the clutch 5 according to step a), i.e., also immediately after the first point in time 24. In step c), the speeds 16 of the clutch components 8, 9 are synchronized with one another as quickly as possible. It is shown here that a rotational speed 16 of one clutch component 8, 9 is increased until a (constant) rotational speed 16 of the other clutch component 9, 8 is reached at the second point in time 35.

According to step d), the system 32 determines that the synchronization state has been reached by the clutch components 8, 9. The speeds 16 of the clutch components 8, 9 must be similar to the extent that coupling of the clutch components 8, 9 is possible, shown here by the transition of the fifth curve 29 to a constant speed 16 at the second point in time 35.

If a synchronization state is reached, the actuator 10 is energized with an actuating current 17 at the second point in time 35 in accordance with step e) (see third curve 27 and fourth curve 28 following the third curve 27), wherein the piston 11 is displaced from the starting position 12 to the end position 13. The actuating current 17 is significantly greater than the bias current 15 previously applied. The actuating current 17 overcomes the resistances in the clutch assembly 4, which are also present in step b), and displaces the piston 11 in the axial direction 7 to actuate the clutch 5.

The seventh curve 31 shows the course of the position 20 of the first clutch component 8 when a bias current 15 is set. The first clutch component 8 is actuated by the piston 11, which moves in the axial direction 7 between a starting position 12 and an end position 13 and transmits this movement to the first clutch component 8. At a fourth point in time 37, the first clutch component 8 or the piston 11 reaches its end position 13 in the axial direction 7.

The end position 13 of the piston 11 or the first clutch component 8 is now reached at a fourth point in time 37, which is significantly earlier than the third point in time 36. This can be attributed primarily to the faster establishment of the actuating current 17, which now has to be increased from the value of the bias current 15 to the value of the actuating current 17 and not from zero.

The time saving possible with the disclosed method can be seen from the distance between the fourth time 37 (end position 13—detected by position sensor 21—is reached when actuator 10 is supplied with bias current 15) and the third time 36 (end position 13 is reached when actuator 10 is directly supplied with actuating current 17 from a value of zero).

LIST OF REFERENCE SIGNS 1 powertrain
2 vehicle
3 transmission housing
4 clutch assembly
5 clutch
6 actuation unit
7 axial direction
8 first clutch component
9 second clutch component
10 actuator
11 piston
12 starting position
13 end position
14 transmission fluid
15 bias current
16 speed
17 actuating current
18 sliding disk
19 sensor disk
20 position
21 position sensor
22 return spring
23 coil
24 first point in time
25 first curve (setpoint current without bias current)
26 second curve (actual current without bias current)
27 third curve (setpoint current with bias current)
28 fourth curve (actual current with bias current)
29 fifth course (speed)
30 sixth course (position of first clutch component without bias current)
31 seventh course (position of first clutch component with bias current)
32 system
33 circumferential direction
34 time
35 second point in time
36 third point in time
37 fourth point in time
38 axle
39 pinion gear
40 differential cover
41 gearwheel
42 side bevel gear

The invention claimed is:

1. A method for operating a powertrain of a vehicle, wherein the powertrain has at least one transmission housing and a clutch assembly arranged therein with a clutch that operates interlockingly as well as an actuator for actuating the clutch; wherein the clutch comprises at least a first clutch component displaceable in an axial direction and a second clutch component which are interlockingly connected to one another when the clutch is actuated; wherein the actuator comprises an electromagnetic actuator with a piston; wherein the piston is displaced from a starting position in the axial direction into an end position when the clutch is actuated and thereby displaces the first clutch component; wherein the clutch components are interlockingly connected to one another only after a synchronization state has been reached; wherein at least the piston and the clutch are at least partially acted upon by a transmission fluid;
the method comprising:
a) determining a request to actuate the clutch and to establish an interlocking connection between the clutch components;
b) energizing the actuator with a bias current, wherein the piston remains in the starting position;
c) initiating a synchronization of speeds of the clutch components, wherein the piston remains in the starting position;
d) determining that the synchronization state has been reached by the clutch components, wherein the piston remains in the starting position; and
e) upon determining that the synchronization state has been reached by the clutch components, energizing the actuator with an actuating current, wherein the piston is displaced from the starting position into the end position.

2. The method of claim 1, wherein the bias current is at least 20% of the actuating current.

3. The method of claim 1, wherein a value of the bias current is kept constant until step e) is initiated.

4. The method of claim 1, wherein the actuating current is at most 6 amperes.

5. The method of claim 1, wherein static friction of the components of the clutch assembly displaced during actuation of the actuator is only overcome by the actuator when the bias current is exceeded.

6. The method of claim 5, wherein the components include the piston and at least one of:
a sliding disk, which is arranged between the piston and a sensor disk;
a sensor disk which interacts with a position sensor to determine a position of the piston;
a return spring which, as an energy store element, provides a force for the return movement of the piston from the end position back to the starting position; or
a cam ring as the first clutch component.

7. The method of claim 1, wherein the actuating current builds up from the value of the bias current, which is greater than zero amps.

8. An apparatus for a powertrain of a vehicle, comprising:
a transmission housing and a clutch assembly arranged therein with a clutch that operates interlockingly;

an actuator arranged to actuate the clutch;
wherein the clutch comprises at least a first clutch component displaceable in an axial direction and a second clutch component that are interlockingly connected to one another when the clutch is actuated;
wherein the actuator comprises an electromagnetic actuator with a piston that is displaceable from a starting position in the axial direction into an end position when the clutch is actuated to thereby displaces the first clutch component;
wherein the clutch components can only be interlockingly connected to one another after a synchronization state has been reached;
wherein at least the piston and the clutch are at least partially acted upon by a transmission fluid; and
a control unit programmed to:
a) determine a request to actuate the clutch and to establish an interlocking connection between the clutch components;
b) energize the actuator with a bias current, wherein the piston remains in the starting position;
c) initiate a synchronization of speeds of the clutch components, wherein the piston remains in the starting position;
d) determine that the synchronization state has been reached by the clutch components, wherein the piston remains in the starting position; and
e) upon determining that the synchronization state has been reached by the clutch components, energize the actuator with an actuating current, wherein the piston is displaced from the starting position into the end position.

9. The apparatus of claim 8, wherein the bias current is at least 20% of the actuating current.

10. The apparatus of claim 8, wherein a value of the bias current is kept constant until step e) is initiated.

11. The apparatus of claim 8, wherein the actuating current is at most 6 amperes.

12. The apparatus of claim 8, wherein static friction of the components of the clutch assembly displaced during actuation of the actuator is only overcome by the actuator when the bias current is exceeded.

13. The apparatus of claim 12, wherein the components include the piston and at least one of:
a sliding disk, which is arranged between the piston and a sensor disk;
a sensor disk which interacts with a position sensor to determine a position of the piston;
a return spring which, as an energy store element, provides a force for the return movement of the piston from the end position back to the starting position; or
a cam ring as the first clutch component.

14. The apparatus of claim 8, wherein the actuating current builds up from the value of the bias current, which is greater than zero amps.

* * * * *